United States Patent
Ciniello et al.

(10) Patent No.: US 10,762,801 B2
(45) Date of Patent: Sep. 1, 2020

(54) FUNCTIONAL DEVICE, IN PARTICULAR A ROBOT, FOR EDUCATIONAL USE WITH MODULES THAT CAN BE COMBINED TOGETHER

(71) Applicant: Comau S.p.A., Grugliasco (Turin) (IT)

(72) Inventors: Francesco Ciniello, Grugliasco (IT); Maurizio Cremonini, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 305 days.

(21) Appl. No.: 15/849,765

(22) Filed: Dec. 21, 2017

(65) Prior Publication Data
US 2018/0182260 A1     Jun. 28, 2018

(30) Foreign Application Priority Data
Dec. 23, 2016 (IT) ................. 102016000130715

(51) Int. Cl.
*G09B 25/00* (2006.01)
*G09B 19/00* (2006.01)
*B25J 9/10* (2006.01)
*B25J 9/08* (2006.01)

(52) U.S. Cl.
CPC ............ *G09B 19/0053* (2013.01); *B25J 9/08* (2013.01); *B25J 9/1035* (2013.01); *G09B 19/00* (2013.01)

(58) Field of Classification Search
USPC ....... 434/118, 219, 276, 300, 301, 365, 372, 434/379; 74/490.01, 490.03, 490.05; 700/245, 247
See application file for complete search history.

(56) References Cited

U.S. PATENT DOCUMENTS

| | | | |
|---|---|---|---|
| 5,155,423 A * | 10/1992 | Karlen | B25J 9/04 318/568.1 |
| 5,293,107 A | 3/1994 | Akeel | |
| 5,355,743 A | 10/1994 | Tesar | |
| 5,428,713 A | 6/1995 | Matsumaru | |
| 6,243,622 B1 * | 6/2001 | Yim | G06F 3/016 345/12 |
| 6,636,781 B1 * | 10/2003 | Shen | B08B 9/045 318/568.11 |
| 6,922,610 B2 * | 7/2005 | Okamoto | B25J 9/06 219/121.74 |
| 8,410,732 B2 * | 4/2013 | Kassow | B25J 19/0004 318/372 |
| 8,571,711 B2 * | 10/2013 | Jacobsen | B08B 9/045 180/9.21 |

(Continued)

FOREIGN PATENT DOCUMENTS

| | | |
|---|---|---|
| EP | 0441397 A1 | 8/1991 |
| WO | 99012661 A1 | 3/1999 |
| WO | 2015183419 A1 | 12/2015 |

*Primary Examiner* — Kurt Fernstrom
(74) *Attorney, Agent, or Firm* — Young Basile Hanlon & MacFarlane, P.C.

(57) ABSTRACT

A robot device having modules that can be combined together to produce alternative devices useful for educational purposes. The robot device includes one or more frame bodies and one or more motorized joints connected to the frame bodies and in communication with a central control unit. Each motorized joint includes a fixed portion and a movable portion. Through a combination of frame bodies and motorized joints modules, alternative motorized devices can be generated.

20 Claims, 6 Drawing Sheets

(56) References Cited

U.S. PATENT DOCUMENTS

| | | | |
|---|---|---|---|
| 8,910,538 B2* | 12/2014 | Hayashi | B25J 9/0009 |
| | | | 74/490.05 |
| 9,833,897 B2* | 12/2017 | Soe-Knudsen | B25J 9/1656 |
| 10,022,861 B1* | 7/2018 | He | B25J 19/0075 |
| 10,343,277 B2* | 7/2019 | Gombert | B25J 9/1602 |
| 10,384,355 B2* | 8/2019 | Sekine | B25J 9/0018 |
| 2004/0193318 A1 | 9/2004 | Ito | |
| 2014/0137687 A1* | 5/2014 | Nogami | B25J 18/00 |
| | | | 74/490.03 |

* cited by examiner

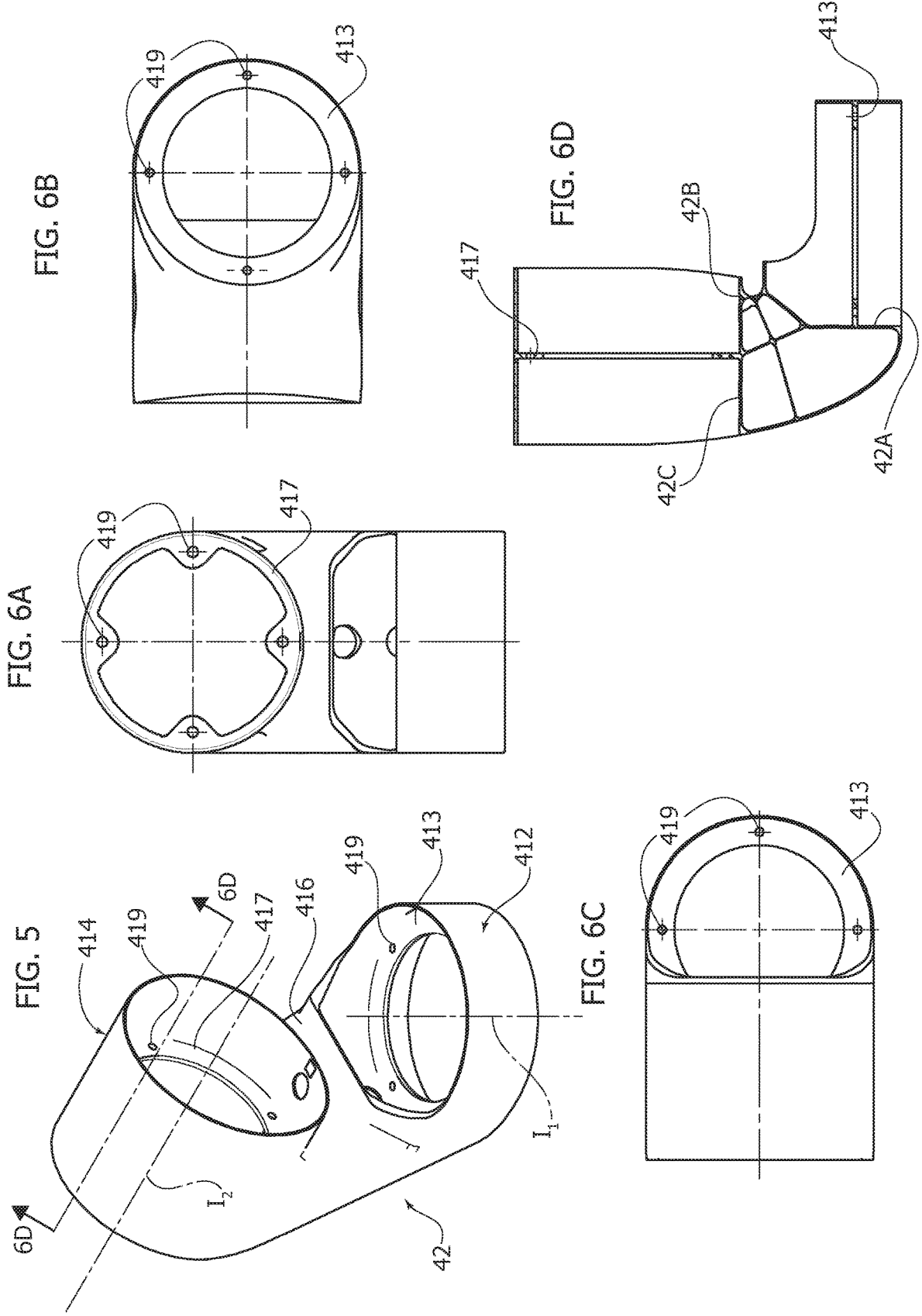

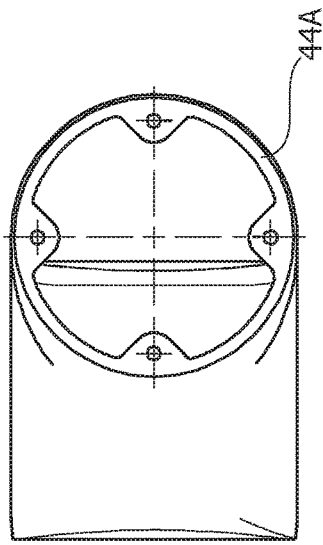
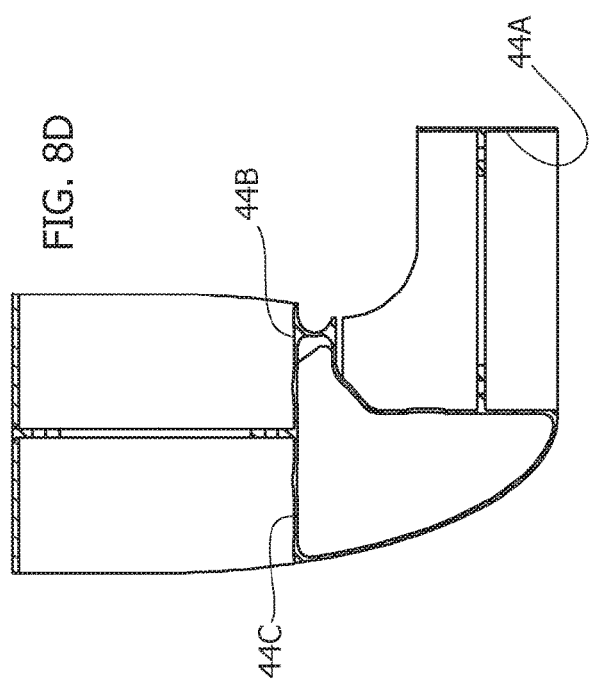
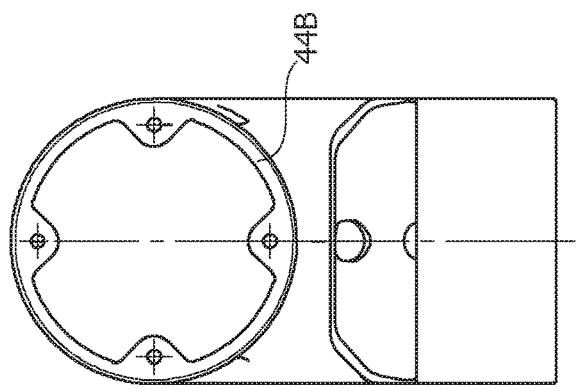
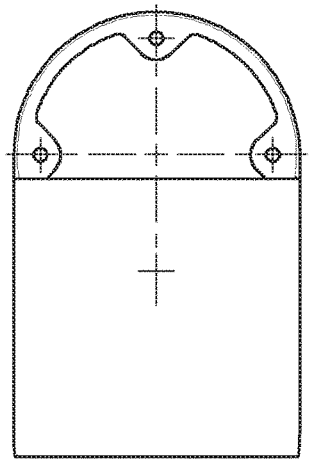
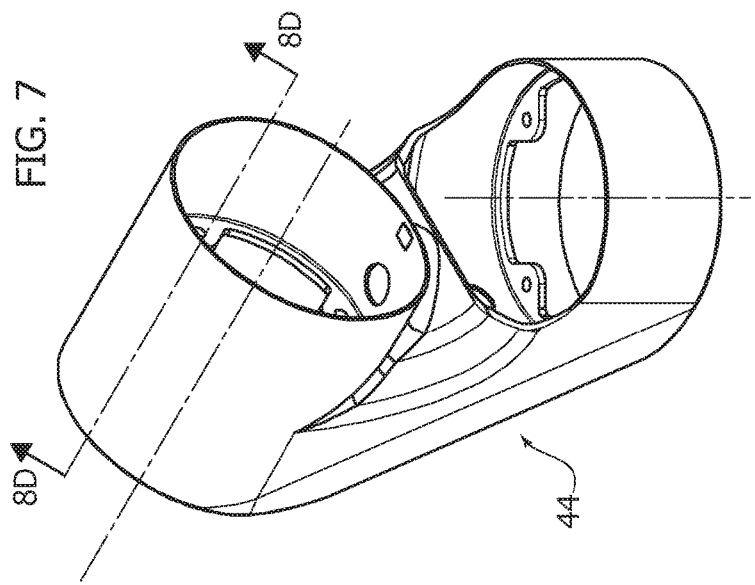

FUNCTIONAL DEVICE, IN PARTICULAR A ROBOT, FOR EDUCATIONAL USE WITH MODULES THAT CAN BE COMBINED TOGETHER

CROSS-REFERENCE TO RELATED APPLICATIONS

This application claims priority benefit to Italian Patent Application No. 102016000130715 filed Dec. 23, 2016 the entire contents of which is incorporated herein by reference.

TECHNICAL FIELD

The present invention relates to a functional device with modules that can be combined together for educational use.

BACKGROUND

With reference to the prior art, there are today commercially available small-sized robots, which generally present the configuration of an articulated arm, which are designed for applications regarding activities of research or else for use in the didactic and educational field, or also for hobby purposes.

The above robots are characterized, not only by being small-sized, but also by having a structure made up of modules that can be combined together, precisely with a view to enabling even unskilled operators to configure and install these robots by themselves.

In the generic field of robotics, modular structures for robots have in any case already been widely known for some time, as emerges from the documents of the prior art U.S. Pat. Nos. 5,428,713; 5,293,107.

The document No. U.S. Pat. No. 5,293,107 regards a robot arm comprising a series of structural elements that are connected together in an articulated way through motorized joints. These joints constitute independent modules that integrate within them a rotary electro-mechanical actuator and a unit for power supply and control of the actuator. In particular, each joint comprises a stator body equipped with a series of windings and a rotor body that has a corresponding series of magnets. Furthermore, the bodies carry on them respective gears designed to constitute a planetary-gear reducer assembly. The rotor and stator bodies of this joint are fixed to the other structural elements of the robot with bolts.

Also the document No. U.S. Pat. No. 5,428,713 regards a modular robot arm, which, however, is made up of a series of modules that are all the same. In this case, each module comprises a motor equipped with a gear reducer, a control unit, which is coaxial and directly connected to the motor, a fixed shaft, which extends from the control unit outwards so as to share the axis of rotation of the motor, a rotary shaft, which extends from the motor outwards so as to share the axis of rotation of the motor, an L-shaped bracket having a first end connected to the fixed shaft and the other end that extends parallel to the axis of rotation of the motor towards the mobile shaft, and a further L-shaped bracket having one end connected to the mobile shaft and the other end that extends parallel to the axis of rotation of the motor towards the fixed shaft.

Modular robot configurations that are available today have, however, proven far from satisfactory as regards use for educational purposes.

SUMMARY

In this context, an object of the present invention is to provide a functional device for educational purposes with a structure having modules that can be combined together, that will bestow on the device a series of advantages according to its specific purpose of use, in particular in terms of simplification of the structure, ease and rapidity of assembly, and multiple possibilities of use.

One example of the functional device includes or more frame members connected to one or more motorized joints. Each joint includes a first, fixed in position cylindrical portion and a second, motorized second cylindrical portion that moves relative to the first cylindrical portion through one or more electric motors included with each joint. The joint first cylindrical and second cylindrical portions are received in respective cylindrical seats on the frame bodies. A control unit and power supply is connected to each joint to selectively actuate the joint motor and move the frame members as desired.

In one example, the functional device includes a central control unit in electrical communication with each joint to selectively actuate and control the movement of each joint according to predetermined instructions.

In one example, the functional device is in the form of a robot useful for educational purposes. In another example, the functional device is in the form of driving vehicle.

As will be seen in detail hereinafter, the functional device described herein is provided for assuming a plurality of configurations of use and can be assembled and disassembled in a particularly simple, fast, and safe way.

BRIEF DESCRIPTION OF THE DRAWINGS

Further characteristics and advantages of the invention will emerge clearly from the ensuing description with reference to the annexed drawings, which are provided purely by way of non-limiting example and in which:

FIG. 5 is an axonometric view of an example of a supporting body used in an example of the invention;

FIG. 6A is a front view of the supporting body in FIG. 5;

FIG. 6B is a bottom view of the supporting body in FIG. 5;

FIG. 6C is a top view of the supporting body in FIG. 5;

FIG. 6D is a cross-sectional view taken along line 6D-6D of the supporting body in FIG. 5;

FIG. 7 is an axonometric view of an alternate example of a supporting body;

FIG. 8A is a front view of the supporting body in FIG. 7;

FIG. 8B is a bottom view of the supporting body in FIG. 7;

FIG. 8C is a top view of the supporting body in FIG. 7;

FIG. 8D is a cross-sectional view taken along line 8D-8D of the supporting body in FIG. 7;

DETAILED DESCRIPTION

Illustrated in the ensuing description are various specific details aimed at providing an in-depth understanding of the examples or embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As mentioned above, the device described herein is a functional device with modules that can be combined together, for example for educational purposes. With this specification of use is meant the use of the device, not so much as regards performance of particular operations by the device, as rather for performance of the preliminary steps of construction and programming of the functioning device, which are carried out mainly with the aim of teaching the user these steps and/or experimenting them. The destination of use may regard, for example, schools or else communities of people who are particularly keen on robotics.

Figure 1:
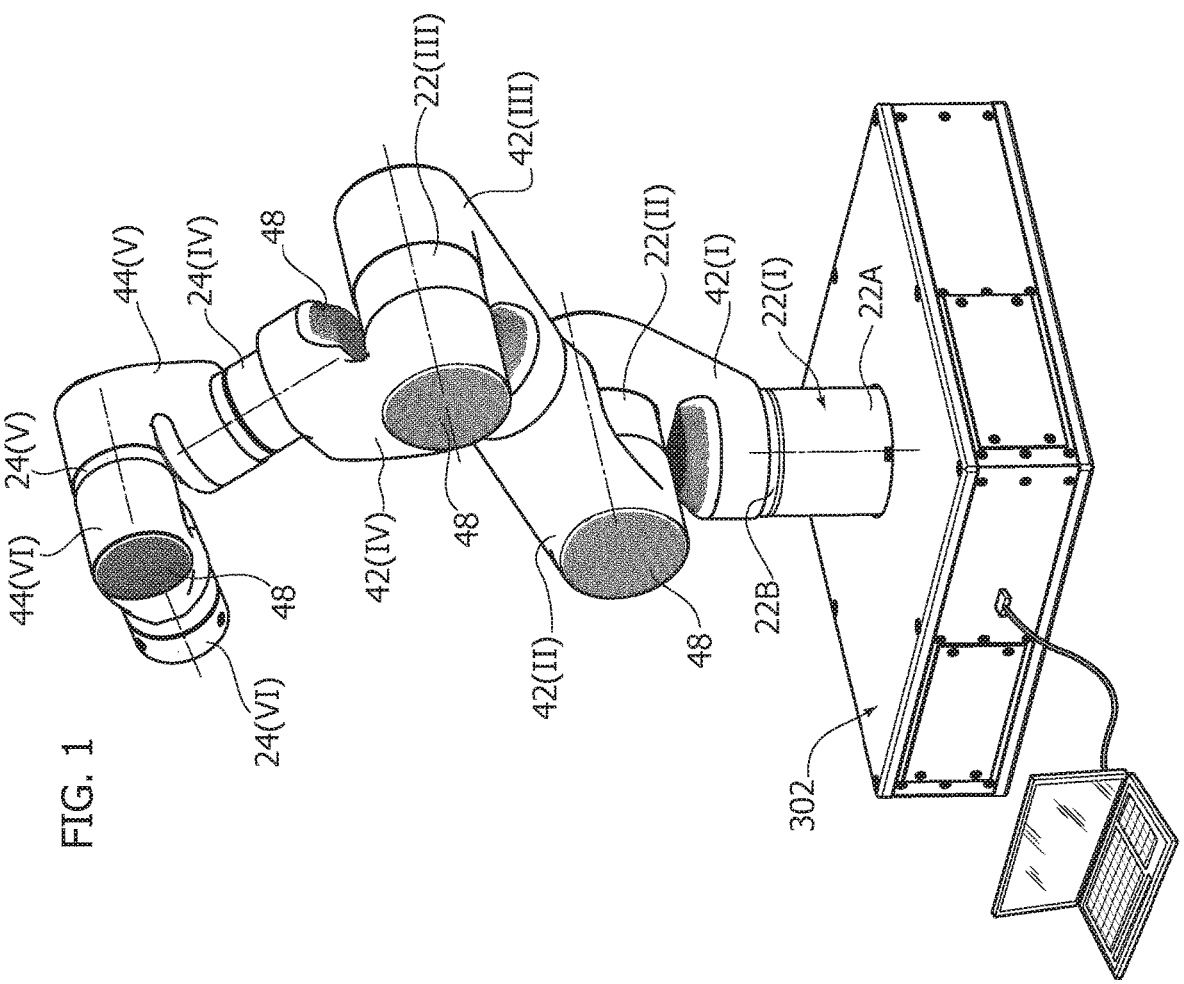
FIG. 1 is an axonometric view of an example of the invention assembled in a robot-arm configuration.

Illustrated in the figures is a preferred embodiment of the above device. In FIG. 1 the device is assembled in a robot-arm configuration, whereas in FIG. 10 it is assembled in a configuration of a vehicle with programmable driving.

It should now in general be noted that the device described herein is constituted by a series of supporting bodies and moreover by a series of motorized joints through which the supporting bodies are connected together in an articulated way.

With specific reference to the embodiment illustrated, the device comprises in particular motorized joints 22 and 24, which connect together in an articulated way the series of the frame bodies 42, 44. In FIG. 1, where the device is shown in the form of a robot-arm configuration, the Roman numeral in brackets, alongside the reference of each component, indicates the corresponding sequential number within the respective series; i.e., the reference 22(II) indicates the second motorized joint of the series of joints 22, and likewise the reference 42(II) indicates the second frame body of the series of frame bodies 42.

The motorized joints constitute units for independent actuation of the movement of rotation about the respective axis of rotation Xi. In particular, as will be seen in the detail in what follows, each joint comprises one or more electric motors and a module for power supply and control of the motors.

Now, according to an important characteristic of the device described herein, the joints of the device have a first, fixed, cylindrical portion, which contains inside it the aforesaid electric motors of the joint, and a second cylindrical portion, which is mobile in rotation driven by the electric motors referred to above. At the same time, the frame bodies each identify a first seat and a second seat, which are both cylindrical and are pre-arranged for receiving and having fixed indifferently thereon the fixed cylindrical portion or else the mobile cylindrical portion of the motorized joints.

In various embodiments, as in the one illustrated, the frame bodies have, in particular, a cross-sectional profile that is as a whole L-shaped so as to arrange the two cylindrical seats with the respective axes mutually orthogonal. Furthermore, in various embodiments, as in the one illustrated, each frame body is provided, on at least one of its orthogonal sides, with two opposed coaxial cylindrical seats, so as to be able to house, simultaneously or separately, two motorized joints according to two opposite orientations.

Figure 2A:
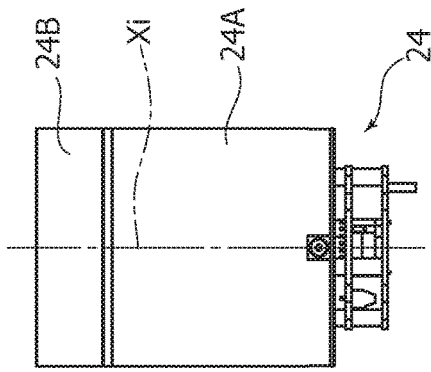
FIGS. 2A and 2B are respective front views of each of two joints used in an example of the invention.
Figure 2B:
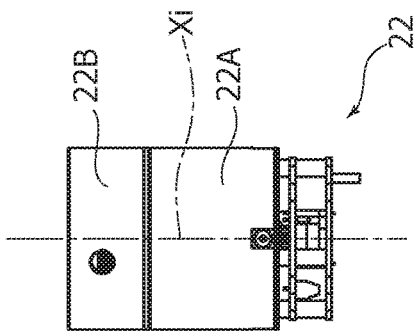

To return now to the embodiment of the figures, the joints 22 and 24 have the fixed cylindrical portions 22A, 24A and the mobile cylindrical portions 22B and 24B (FIGS. 2A and 2B), respectively. On the other hand, the frame bodies 42 and 44 have on one side the respective cylindrical seats 42A and 44A, and on the other side the two opposed cylindrical seats 42B, 42C and 44B, 44C (FIGS. 6D and 8D).

The joints 22 and 24 and, in the same way, the frame bodies 42 and 44 differ from one another basically as regards their dimensions, and in particular the joints 22 and the frame bodies 42 constitute larger components that are prearranged for being connected directly with one another, and likewise the joints 24 and the frame bodies 44 constitute smaller components that can be directly connected together. As will be seen in what follows, the device may instead envisage adapter modules for connecting together, for example, a large frame body 42 with a small joint 24, and vice versa.

Figure 10:
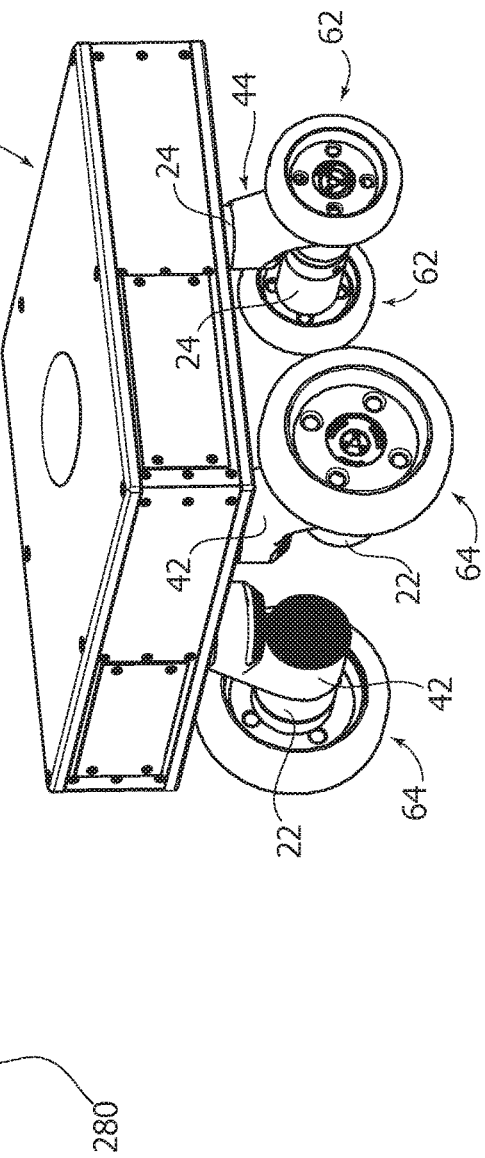
FIG. 10 is an example of the invention in an exemplary form of a self-driven vehicle.

The components mentioned can be assembled together to obtain, for example, the robot arm illustrated in FIG. 1 or else to obtain the vehicle of FIG. 10. As will be seen in what follows, this flexibility derives from the possibility provided in this device of assembling together the joints and the frame bodies according to multiple modalities.

It is clear that it is possible to create multiple devices through these basic components, and in effect the possibilities in this sense basically depend upon the number of components available.

The above aspects will in any case emerge clearly following upon the detailed examination of the structure of the individual components provided hereinafter.

Figure 3:
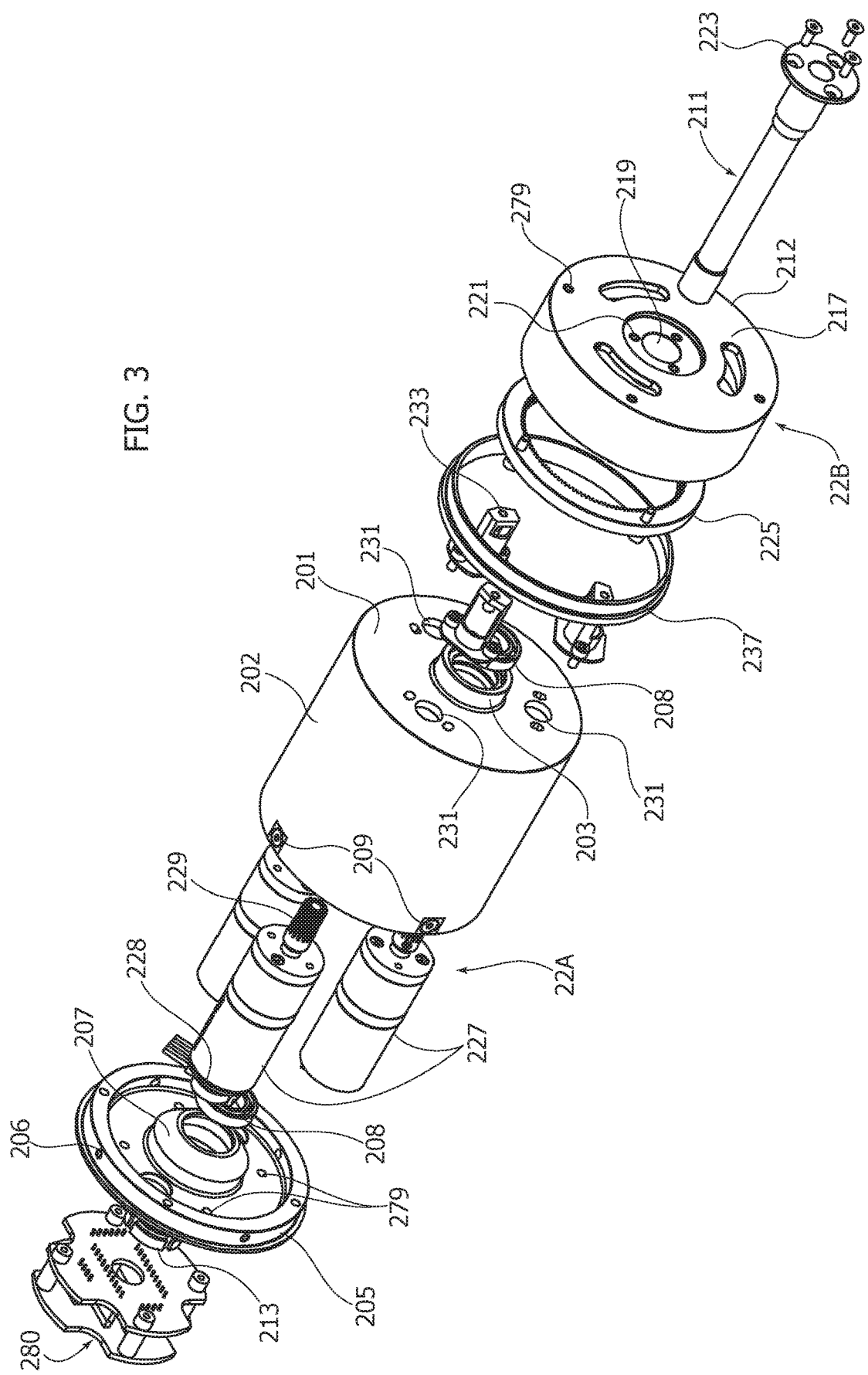
FIG. 3 is an exploded axonometric view of the joint of FIG. 2b.
Figure 4:
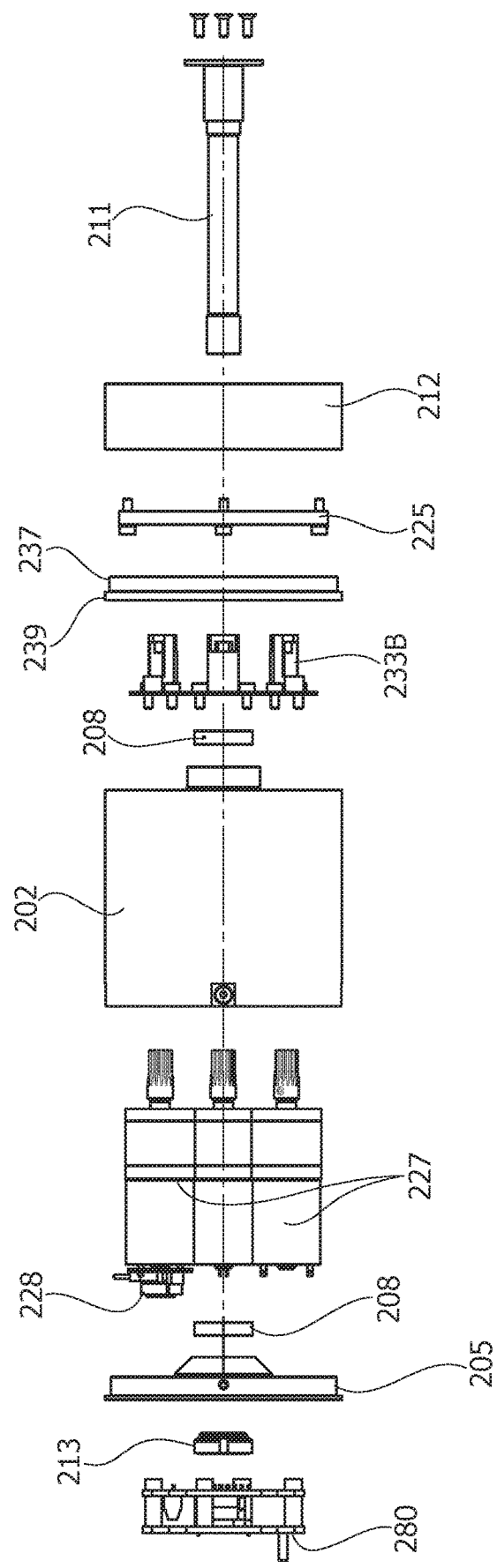
FIG. 4 is a side view of the joint in FIG. 3.

With reference to the joints, see in particular the larger joint 22 illustrated in detail in FIGS. 3 and 4.

In various preferred embodiments, as in the one illustrated, the fixed cylindrical portion 22A of the joint is constituted by a cylindrical container 202, which is closed on one side by a wall 201, provided in the central part of which is a perforated external cylindrical mouth 203. On the opposite side with respect to the wall 201, the cylindrical container 202 is closed by a cover 205, which is equipped with a perforated internal mouth 207, sharing the central axis of the container 202. The cover 205 is fixed to the container 202 through fixing members of a conventional type. In various embodiments, as in the one illustrated, along the lateral edge of the cover 205 a plurality of threaded bores 206 are provided and likewise, at the end edge of the container 202 there are provided in corresponding positions bores 209 with which the bores 206 come to be aligned when the cover 205 is assembled on the container 202. In this condition, the two components are hence fixed together via screws that engage the bores referred to.

The joint 22 comprises a central hollow shaft 211, which is rotatably supported, through interposition of bearing members 208, on one side, in the proximity of a first end thereof, by the mouth 207 of the cover 205 and, in the proximity of its opposite end, by the mouth 203 of the container 202.

The shaft 211 projects outwards, through the mouth 207, with a threaded end thereof that is engaged by a ring nut 213, which fastens the bearing member 208 against the outer wall of the mouth 207.

The opposite end of the shaft 211 is, instead, designed to be fixed to a further cylindrical shell 212, which constitutes the second cylindrical portion 22B of the joint. In particular, the shell 212 has a cylindrical side wall, which is of the same diameter as the wall of the container 202, and a mouth edge that faces the container 202.

The shell 212 has a circular bottom wall 217, provided on which is a central opening 219 that is traversed by the shaft 211. On the outer side of the wall 217, made around the central opening 219 is a lowered circular seat 221, which is engaged by the flange 223 defined on the end of the shaft 211. The flange 223 and the bottom wall of the seat 221 have respective bores in corresponding positions for being fixed together with screws.

Fixed on the inner side of the wall 217 is a ring 225 having an internal toothing.

Arranged, instead, within the container 202 are a plurality of electric motors 227 (3 shown in FIG. 3), assembled on the output shafts of which are respective pinions 229 that project beyond the wall 201 through openings 231 so as to engage the internal toothing of the ring 225. In various preferred embodiments, the motors 227 have an integrated reducer module.

In various embodiments, as in the one illustrated, associated to each motor or motor reducer 227 is a bracket 233, which is mounted on the outer side of the wall 201 and has a central portion equipped with a pin 233B designed to engage rotatably the end of the pinion 229 so as to constrain it axially. This mode of assembly of the pin enables reduction of the stresses on the shaft of the motor/motor reducer.

The bracket 233 moreover has two perforated lateral portions, which are designed to set themselves in a position corresponding to bores provided on the wall 201. In the areas of the same bores but on the inner side of the wall, the motors 227 present, instead, threaded bores made in their casing. Via screws that are inserted in the bores of the lateral portions of the brackets 233 and, after traversing the wall 201, reach the threaded bores provided on the casing of the motors, the motors 227, the brackets 233, and the wall 201 are fixed together, in a single operation. As has been mentioned, in this condition, the central pins 233B of the brackets 233 constrain the pinions 229 axially.

The shell 212 which, as has been said, constitutes the mobile cylindrical portion 22B of the joint, is set in rotation about the axis Xi of the joint, as a result of the driving system constituted by the motors 227, the pinions 229, and the ring 225. It should moreover be noted that set between the shell 212 and the container 202 is an annular element 237 made of low-friction plastic material, which is fixed to the end edge of the shell 212. This element has a cylindrical portion 239, which preferably has substantially the same diameter as the walls of the container 202 and the shell 212 and sets itself in a relation of sliding coupling with the wall 201 of the container 202. The element 237 performs the function of separating from the external environment the components of the joint and at the same time of protecting from wear the parts that interface with one another of the shell 212 and of the container 202.

Fixed on the outer side of the cover 205 is the power-supply and control unit 280 of the joint. In various preferred embodiments, as in the one illustrated, this is constituted by one or more printed-circuit boards (PCBs) that are directly fixed on the cover 205 and carry on them various electronic components that are directly accessible from outside.

Figure 9:
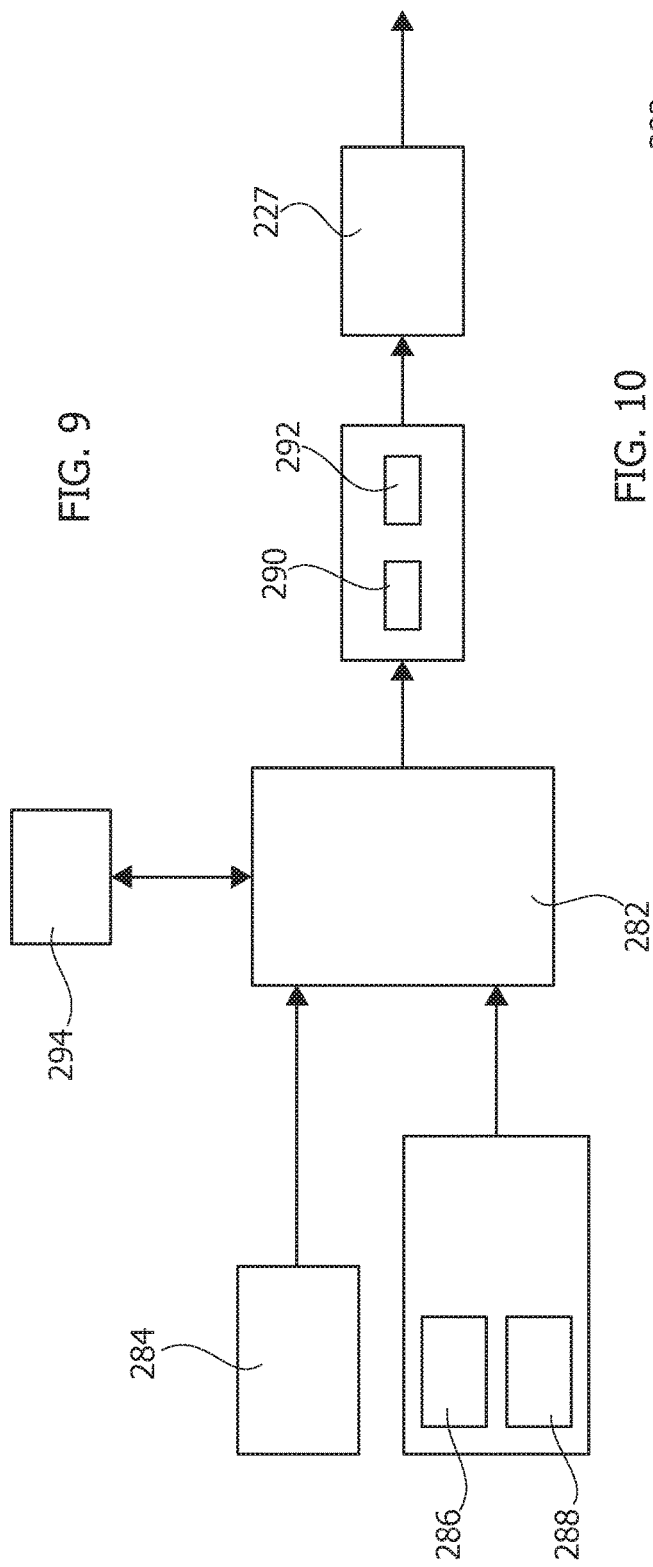
FIG. 9 is a schematic block diagram of one example of a control and power-supply unit.

This unit is represented at the level of functional blocks in FIG. 9. With reference to this figure, the unit comprises a control module 282, a movement-sensing device 284 (for example, comprising one or more accelerometers), one or more communication modules, in particular a wireless communication module 286 (for example, using Wi-Fi or else Bluetooth communication protocols), and a wired data-access module 288, a circuit for driving the motors, in particular a MOSFET driving circuit 290, preferably, comprising an H bridge, and a signal-amplifier module 292, the latter also possibly forming part of the driving circuit.

In various preferred embodiments, the unit 280 further comprises a small display 294 for reproducing, to the advantage of the operator, a sign identifying the individual joint of the series of joints envisaged for the specific application. For instance, with reference to the device of FIG. 1, the display associated to the second joint 22(II) may reproduce the Roman numeral "II". This information is contained in the control module 282.

The control unit 280 of each joint will be programmed independently with a specific protocol.

Furthermore, in various preferred embodiments, in each joint, associated to at least one of the motors 227 is an encoder 228 (see FIG. 4), which is set in signal connection with the control module 282.

Preferably, the functional device described herein further comprises a central control unit 302, with which the units 280 of the various joints communicate and which is configured for sending to the units control signals for co-ordinating together the various joints, for example on the basis of the signals obtained from the sensor devices 284 and from the encoder 282. This unit 302 may be configured for being programmed through a personal computer (see FIG. 1). Furthermore, the unit 302 may comprise a battery pack for supply of the various joints. The electrical and/or signal connection of the various joints with the central unit 302 may be obtained via wires that pass through the various joints, running within the respective hollow shafts 211.

As regards the frame bodies, reference will now be made to the frame body 42 illustrated in FIGS. 5 and 6A-D.

This body has two tubular portions 412 and 414, with circular cross section that have the same diameter, which are oriented with respect to one anther so that their respective axes I1 and I2 will be orthogonal to one another and at the same time contained in one and the same plane. These portions are connected together by a concave connection surface 416, which has, inside it, a series of ribbings designed to stiffen the structure of the frame body. In a substantially central section thereof, the two portions 414 and 412 have a respective internal annular flange 413 and 417.

With reference to FIG. 6D, the flange 413 identifies, together with the underlying region of the portion 412, the cylindrical seat 42A referred to above. On the other hand, the internal flange 417 divides the tubular portion 414 into two substantially equal parts, defining together with these the two cylindrical seats 42B and 42C referred to above, which, as may be seen in this figure, they face in opposite directions.

Each of the seats 42A, 42B and 42C is pre-arranged for obtaining a shape fit with each of the cylindrical portions 22A and 22B of the joint 22. In this connection, it should be noted that the inner diameter of the portions 414 and 412 is selected so that the seats indicated above receive the cylindrical portions 22A and 22B according to a condition where the outer walls of these are set substantially flush with the inner walls of the seats, substantially all along their perimeter.

It should be noted that provided on the flanges 413 and 417 is a plurality of openings 419 that are pre-arranged for being aligned with corresponding bores 279, in particular threaded bores, made both in the fixed cylindrical portion of the joint, in particular on its cover 205, and in the mobile portion of the joint, in particular on its circular wall 217. These bores and openings enable the joints to be fixed to the seats of the frame body with simple screws.

In various preferred embodiments, as in the one illustrated, the seats that are not occupied by joints can be closed by fascias 48, for purely aesthetic purposes.

As has been said above, the joints 24 and the frame bodies 44 have substantially the same structure and the same modalities of operation that have been described above with reference to the joints 22 and to the frame bodies 42.

To return now to FIG. 1, the robot-arm configuration illustrated is obtained by exploiting the possibility indicated of assembling together the joints and the frame bodies according to multiple modalities.

In fact, with reference to the first frame body, designated by the reference 42(I), it houses in its seat 42A the mobile portion 22B of the first joint 22(I) and in its seat 42B the fixed portion of the second joint 22(II).

The second frame body 42(II) houses, instead, in its seat 42B the mobile part of the second joint 22(II) and instead, at its seat 42A a spacer element (not illustrated), which is designed to fix this frame body rigidly to the next frame body, i.e., the third frame body 42(III).

The third frame body 42(III) houses in its seat 42A the spacer element just mentioned and in its seat 42B the fixed portion of the third joint 22(III).

The fourth frame body 42(IV) houses in its seat 42B the mobile part of the third joint (22III) and in its seat 42A an adapter (not illustrated), within which the fixed portion of the fourth joint 24(IV) is housed.

The fifth frame body 44(V) houses in its seat 44A the mobile portion of the fourth joint 24(IV) and in its seat 44B the fixed part of the fifth joint 24(V).

Finally, the sixth frame body 44(VI) houses in its seat 44A the mobile portion of the fifth joint 24(V) and in its seat 44C the fixed part of the sixth joint 24(VI).

With reference now to the configuration illustrated in FIG. 10, the programmable vehicle illustrated comprises a frame body that is constituted by the same central unit 302 of FIG. 1, and a front steering-wheel assembly 62, and two rear-wheel assemblies 64, which are constituted by different combinations of joints and frame bodies.

In particular, the front assembly 62 is constituted by a frame body 44, which houses within its three seats 44A, 44B, and 44C the fixed portions 24A of as many joints 24. The joints 24 that are housed within the seats 44B and 44C are connected by way of their mobile portions 24B to the hubs of respective wheels. The joint 24 that is housed within the seat 44A is instead connected, through its mobile portion 24B, to the central unit 302. The first two joints 24 operate as motor members, whereas the third joint performs the steering function.

On the other hand, the rear-wheel assemblies 64 are each constituted by a frame body 42 that is connected through its seat 42A to the frame of the vehicle, and houses, instead, within its seat 42C, the fixed portion 22A of a joint 22. The mobile portion 22B of this joint is instead connected to the hub of a respective wheel.

It may be noted that the use of the central unit 302 as part of the structure of the vehicle makes it possible to do without the use of wires, this facilitating movement of the vehicle itself.

The frame bodies and the casings of the joints may be made of metal, for example aluminium, or else of polymeric material, preferably polymeric material that is suited for injection moulding of the various bodies, for example polyamide with glass-fibre filler.

In the light of the foregoing, the advantages of the device described herein are now evident. It affords, on the one hand, the possibility of assuming a wide range of functional configurations so that it stimulates the interest and the capacity of planning and programming of the user. Furthermore, its components may in effect be assembled and disassembled very rapidly, seeing that just a few screws are sufficient, but at the same time offer a rigid and safe connection thanks to the cylindrical geometry, described above, which characterizes their attachment portions.

Of course, without prejudice the principle of the invention, the details of construction and the embodiments may vary even significantly, with respect to what has been illustrated herein purely by way of non-limiting example, without thereby departing from the scope of the invention, as this is defined by the annexed claims.

What is claimed is:

1. A functional robot device comprising:
   one or more frame bodies; and
   one or more motorized joints, each joint comprising:
      one or more electric motors;
      a unit for power supply and control of said motors; and
      a first, fixed, cylindrical portion and a second, mobile, cylindrical portion, wherein said first cylindrical portion contains inside it said one or more electric motors,
   wherein each frame body includes a first cylindrical seat and a second cylindrical seat pre-arranged for receiving and connecting thereon one of said motorized joint first cylindrical portion or said second cylindrical portion.

2. The device according to claim 1 wherein said each joint first and said second cylindrical portions and said each frame body first and said second cylindrical seats includes a diameter, wherein the diameters of said first and said second cylindrical seats of said each frame body and of said first and said second cylindrical portions of said each joint are substantially equal, so that selective of said first and said second cylindrical seats receive said respective said first and said second portions according to a condition where outer walls of said first and said second cylindrical portions are set flush with inner walls of said first and said second cylindrical seats all along a respective perimeter.

3. The device according to claim 2 wherein said each joint further comprises:
   a cylindrical container housing said one or more electric motors, said cylindrical container is closed by a cover and defines said first cylindrical portion; and
   a cylindrical half-shell having an end edge positioned to face said cylindrical container, said cylindrical half-shell defining said second cylindrical portion.

4. The device according to claim 3, wherein said one or more electric motors are fixed to a bottom wall of said cylindrical container via screws that traverse corresponding openings provided on said bottom wall and that engage threaded bores provided on a casing of said one or more electric motors.

5. The device according to claim 4 wherein each of said one or more electric motors further comprises an output shaft having a pinion, each said pinion having a portion positioned outside said cylindrical container and extending into said cylindrical half-shell, and said cylindrical half-shell further having an internal toothing that is engaged by said pinions.

6. The device according to claim 5 further comprising a concave-configured bracket connected to said cylindrical container and positioned on an opposing side of said bottom wall from said one or more electric motors, said bracket is operable to rotatably engage each pinion and constraining said pinion axially with respect to an action that tends to cause said pinion to slide out of said output shaft.

7. The device according to claim 3, wherein the outer cylindrical walls of said first and second cylindrical portions are aligned with one another.

8. The device according to claim 1, wherein said each frame body comprises at least one tubular portion with an annular flange defining at least one of said first and said second cylindrical seats.

9. The device according to claim 8, wherein provided on said annular flange is a series of openings and wherein provided on said first and second cylindrical portions of said each joint is a series of threaded bores, which are pre-arranged for being aligned with said openings provided on said annular flanges in order to fix said each joint on said each frame body using screws.

10. The device according to claim 1 wherein said one or more frame bodies further comprise a L-shaped configuration wherein said first cylindrical seat and said second cylindrical seat have respective axes positioned mutually orthogonal to one another.

11. The device according to claim 1 wherein said one or more frame bodies said first or said second cylindrical seat comprises two opposed coaxial cylindrical seats operable to house said one or more joints according to two opposite orientations.

12. The device according to claim 1, wherein said first and second cylindrical portions of said one or more joints have a respective circular end wall defining one or more threaded bores operable to connect said respective one or more joints to said respective one or more frame bodies.

13. The device according to claim 1 wherein each joint further comprises a power supply and control unit in electrical communication with the one or more electric motors.

14. The device according to claim 13 wherein said power-supply and control unit further comprises a display for reproducing a sign identifying the motorized joint from among a series of joints provided.

15. The device according to claim 13 further comprising a central control unit in electrical communication with each power supply and control unit.

16. A functional programmable driving vehicle device comprising:
one or more frame bodies; and
one or more motorized joints, each joint comprising:
one or more electric motors;
a unit for power supply and control of said motors; and
a first, fixed, cylindrical portion and a second, mobile, cylindrical portion, wherein said first cylindrical portion contains inside it said one or more electric motors, wherein each frame body includes a first cylindrical seat and a second cylindrical seat pre-arranged for receiving and connecting thereon one of said motorized joint first cylindrical portion or said second cylindrical portion.

17. The driving vehicle according to claim 16 wherein said each joint first and said second cylindrical portions and said each frame body first and said second cylindrical seats includes a diameter wherein the diameters of said first and said second cylindrical seats of said each frame body and of said first and said second cylindrical portions of said each joint are substantially equal, so that selective of said first and said second cylindrical seats receive said respective said first and said second portions according to a condition where outer walls of said first and said second cylindrical portions are set flush with inner walls of said first and said second cylindrical seats all along a respective perimeter.

18. The device according to claim 17 wherein said each joint further comprises:
a cylindrical container housing said one or more electric motors, said cylindrical container is closed by a cover and defines said first cylindrical portion; and
a cylindrical half-shell having an end edge positioned to face said cylindrical container, said cylindrical half-shell defining said second cylindrical portion.

19. The driving vehicle of claim 16 further comprising:
a front steering-wheel assembly; and
a rear-wheel assembly, each of the front and rear wheel assembly having the one or more frame bodies and the one or more motorized joints.

20. The driving vehicle of claim 19 further comprising a central control unit.

* * * * *